United States Patent Office 2,894,944
Patented July 14, 1959

2,894,944

NITROGEN CONTAINING STARCH DERIVATIVES

Eugene F. Paschall, Orland Park, Ill., assignor to Corn Products Company, a corporation of Delaware No Drawing. Application November 14, 1956
Serial No. 621,990

6 Claims. (Cl. 260—233.3)

This invention relates to new and novel derivatives of starch and their preparation. More particularly it relates to cationic nitrogen substituted derivatives of starch formed by reacting starch with nitrogenous compounds selected from the group consisting of disubstituted cyanamides represented by the formula,

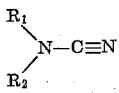

wherein $R_1$ and $R_2$ may be from the group consisting of alkyl, substituted alkyl, alkene, aryl and aralkyl.

The main object of this invention is to provide new and novel compositions of matter referred to above and a process for making same.

Several methods have been proposed in the past for making basic amino derivatives of polymeric carbohydrates. For example, cellulose has been treated with various amino alkyl halides to form cellulose derivatives containing basic amino nitrogen. Products thus prepared usually have been severely degraded because of vigorous reaction conditions required to activate the halogen sufficiently to effect etherification. Also, methods have been proposed to prepare amino derivatives of starch by reacting the latter with ethylenimine. This reagent is extremely toxic and quite expensive making the process for production both hazardous and uneconomical.

I have discovered that products referred to above and possessing cationic activity can be prepared by treating a polymeric carbohydrate such as starch and cellulose or derivatives thereof with a substituted cyanamide, shown above, using an alkaline substance to catalyze the relation. The pH should be above 7 during the reaction.

The course of the reaction is not known with certainty but is believed to follow the course indicated by the following equation:

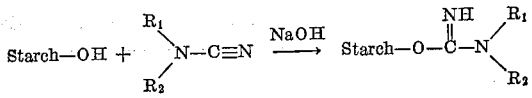

The cationic character of the product is believed to result from the presence of imino group (=NH). The products may be rendered cationic in behavior partially or wholly by converting the imino nitrogen to an ionic salt by treating the product with an acidic substance.

The products of this invention are designated herein as starch imino disubstituted carbamates. As examples, the reaction product of starch and dimethylcyanamide would be known as starch imino dimethylcarbamate and that prepared from starch and dibenzylcyanamide, starch imino dibenzylcarbamate.

In order to prepare the starch derivative, a disubstituted cyanamide is incorporated with a suitable solvent, substantially unreactive toward the reagent under the reaction conditions employed, e.g., water, dimethylformamide, acetone, dioxane, isopropyl alcohol, carbon tetrachloride etc., and then the starch added thereto, sufficient solvent being employed to keep the starch in suspension. An alkaline catalyst is then added to the starch slurry to promote reaction. Alternatively the reaction may be performed using semi-dry starch e.g., starch containing 8-14 percent moisture, the amount contained in most commercial starches. The upper value of 14 percent is not critical. However, when the semi-dry starch contains more than 14 percent of moisture it is difficult to mix the starch and the reagent. The reagent if wholly or partially soluble in water may be blended directly into the semi-dry starch either prior to or following alkali addition and the semi-dry mixture heated in an open or closed system depending on the volatility of the reagent. Reagents which are substantially or completely insoluble in water, may first be dissolved in a minimum amount of a suitable solvent and the resulting solution dry blended with the semi-dry starch either prior to or following alkali addition. In some cases, where the reagent is not miscible with water, it may be desirable to employ starch which has been previously dried to a moisture level of from 0 to 8 percent.

The reaction appears to be spontaneous, i.e., occurs at room temperature, however, heat and increased amount of catalyst increase the reaction rate. In carrying out semi-dry reactions, it is generally desirable to use smaller amounts of alkali and higher reaction temperatures than are required in slurry reactions.

My process is applicable to the preparation of both gelatinized and ungelatinized starch products. If an ungelatinized starch product is desired, ungelatinized starch is employed and the temperature and alkali concentration maintained low enough to prevent gelatinization during derivatization. Salts such as sodium sulfate and sodium carbonate may be incorporated to raise the gelatinization temperature of starch. If an aqueous medium has been used and the starch maintained in granular form, the catalyst and unreacted reagent may be removed after neutralization by filtration and, if desired, the remaining salts and unreacted reagent removed by aqueous, organic or an aqueous-organic solvent washing. If the starch derivative is gelatinized either during preparation or by using a previously gelatinized starch, the catalyst and unreacted reagent may be removed as by filtration, after flocculation of the derivative with alcohol and, if desired, the remaining salts removed by aqueous-organic or organic solvent washing.

My imino-nitrogen substituted starch derivatives are suitable for a variety of uses. These products gelatinize in hot water to form viscous starch pastes which are positively charged, and therefore are cationically active, at pH values below about 10.0. This characteristic makes the derivatives substantive to materials which possess a negative electrical charge such as cellulose fibers and anionic colloids, thus making the products useful as sizing agents for textiles and paper pulp and as flocculating agents for a host of anionic colloids.

My invention is applicable to all polymeric carbohydrates in general but is described with particular reference to corn starch. It is applicable to all starches, e.g., corn, potato, tapioca, soya, rice, wheat, waxy maize, and grain sorghum. The starch may be raw or modified as with acids, oxidizing agents, and the like, and it may be in gelatinized or ungelatinized form. My invention is also applicable to cellulose, e.g., wood pulp and cotton linters, and to other polysaccharides.

A wide variety of alkaline compounds may be used as catalyst in my invention. These include the alkali metal hydroxides, alkaline earth oxides and hydroxides, various quaternary ammonium bases and alkaline reacting salts such as sodium phosphate and sodium carbonate, The invention will be further illustrated by examples which are intended as typical and informative only and in no way limiting the invention.

Example 1

This example illustrates the preparation of starch imino diallylcarbamate.

One-tenth mole (12.3 grams) of diallylcyanamide was added to a starch slurry consisting of one mole of starch, 0.14 mole of sodium sulfate and 0.1 mole of NaOH in 270 ml. of water. The mixture was stirred 18 hours at 50° C. in a closed reaction vessel. The reaction product was then neutralized to pH 6.5 with 0.12 mole of HCl, filtered and the filter cake washed, first with one liter of water then with 500 ml. of methanol, to eliminate unreacted diallylcyanamide. After air drying the product analyzed 0.5 percent nitrogen by Kjeldahl nitrogen analysis, corresponding to a D.S. of 0.03.

A cooked paste of the product was more viscous and stable with respect to setback than a cooked paste of parent starch at an equivalent solids content. The derivative was cationic in behavior. A copper ore slime (containing 0.5 percent solids) was agitated with 20 p.p.m. of the derivative (dry basis). Flocculation occurred immediately. After settling the supernatant liquid was clear, indicative of complete removal of the slime.

Example 2

This example illustrates the preparation of a starch imino dimethylcarbamate.

One-tenth mole (7.5 grams) of dimethylcyanamide was added to a starch slurry consisting of one mole of starch, 0.14 mole $Na_2SO_4$, 0.02 mole of NaOH in 250 ml. of water. The slurry which had a pH of 11.6 was then stirred 18 hours at 40° C. in a closed reaction vessel. The product was neutralized to pH 7.0 with 0.033 mole of HCl, filtered, and the filter cake thoroughly washed with water and dried.

The product analyzed 0.37 percent nitrogen and pasted in hot water to form a clear paste which did not setback on standing two days. The product showed the same cationic activity a did the product of the previous example.

Example 3

This example illustrates the preparation of a starch imino dibenzylcarbamate by semi-dry process.

0.05 mole (10 grams) of dibenzylcyanamide was dispersed in 15 ml. of dimethylformamide and the solution dry blended with one mole raw corn starch containing 0.02 mole of $Na_3PO_4$ and 14 percent moisture. The pH of the mixture when slurried in water was 11.0. The semi-dry mixture was then heated in a closed oven for 2 hours at 103° C. After reaction the product was cooled, slurried in methanol, filtered and the filter cake thoroughly washed with methanol and dried.

The product analyzed 0.11 percent nitrogen by Kjeldahl nitrogen analysis. The product at 5 percent solids in water gelatinize to form a somewhat opaque, viscous paste which was both cationic and surface active in behavior. A portion of the paste containing 0.25 gram of the derivative readily flocculated a 0.1 percent paste of starch sulfate having a D.S. of 0.04 which is anionic in behavior. The derivative formed a stable emulsion at 1.5 percent solids in a 50 percent aqueous hexane system.

Example 4

This example illustrates the preparation of a starch imino dimethylcarbamate.

One-tenth mole (7.5 grams) of dimethylcyanamide was added to a starch slurry consisting of one mole of starch, 0.14 mole $Na_2SO_4$, 0.02 mole of NaOH in 250 ml. of water. The slurry which had a pH of 10.7 was then stirred 18 hours at 40° C. in a closed reaction vessel. The product was neutralized to pH 7.0 with 0.033 mole of HCl, filtered, and the filter cake thoroughly washed with water and dried.

The product analyzed 0.29 percent nitrogen and pasted in hot water to form a clear paste which did not setback on standing two days. The product showed the same cationic activity as did the products of the previous examples.

I claim:

1. As a new composition of matter, compounds represented by the formula

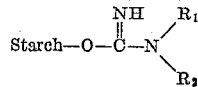

wherein $R_1$ and $R_2$ are from the group consisting of alkyl, alkene and aryl.

2. A process for preparing starch imino disubstituted carbamate which comprises reacting starch with a disubstituted cyanamide, the pH being above 7 during the reaction, said cyanamide being represented by the formula

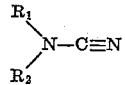

wherein $R_1$ and $R_2$ are from the group consisting of alkyl, alkene and aryl.

3. Process according to claim 2 wherein the disubstituted cyanamide is diallylcyanamide and the reaction is carried out in aqueous slurry under non-gelatinizing conditions.

4. Process according to claim 2 wherein the disubstituted cyanamide is dimethylcyanamide and the reaction is carried out in aqueous slurry under non-gelatinizing conditions.

5. Process according to claim 2 wherein after the reaction is complete the pH of the reaction mixture is adjusted to about 6.5 to 7.0 and the product recovered.

6. A process of preparing starch imino dibenzylcarbamate which comprises dispersing dibenzylcyanamide in a solvent inert thereto, adding this and an alkaline catalyst to air-dried raw starch to form a semi-dry mixture and heating this under non-gelatinizing conditions until the desired product is formed; the pH of the reaction mixture being above 7 during the reaction.

References Cited in the file of this patent

UNITED STATES PATENTS

| | | |
|---|---|---|
| 2,415,043 | Rust | Jan. 28, 1947 |
| 2,621,174 | Gaver | Dec. 9, 1952 |

OTHER REFERENCES

Migrdichian: "The Chemistry of Organic Cyanogen Compounds," Reinhold Publishing Corp., New York (1947), pp. 119 and 120.